Figure 1:
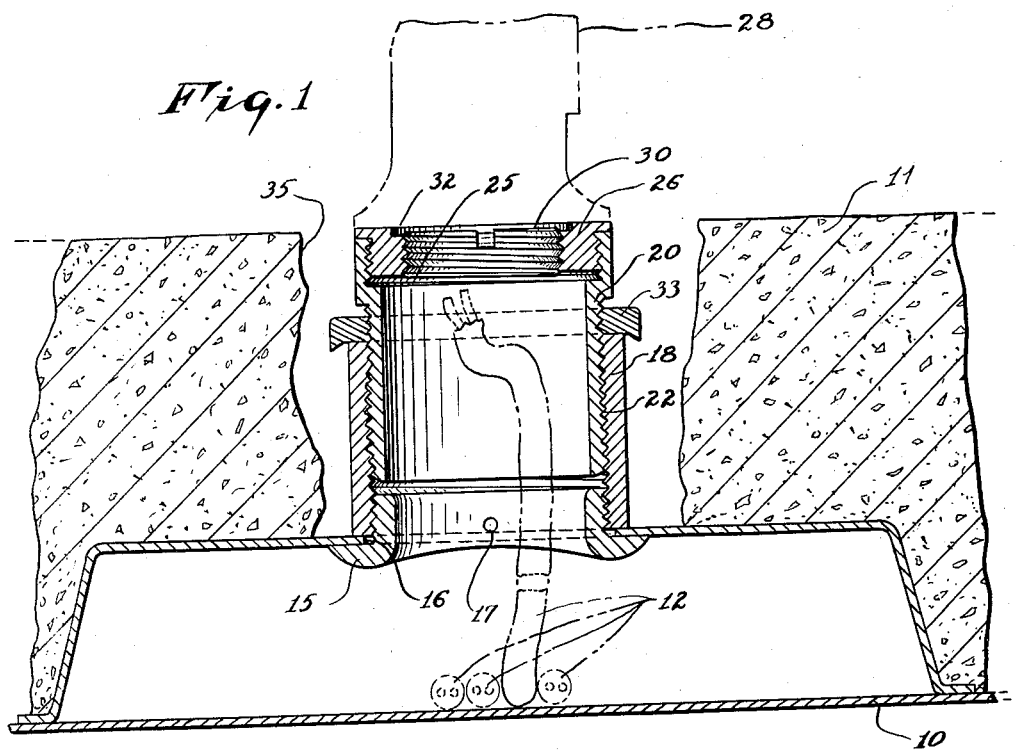

INVENTOR.
Frank J. Kennedy
BY Emery, Varney,
Whittemore & Dix
ATTORNEYS

United States Patent Office 2,909,915
Patented Oct. 27, 1959

2,909,915

FLOOR TAP FOR ELECTRIC HEADER DUCT SYSTEM

Frank J. Kennedy, Mount Lebanon, Pa., assignor, by mesne assignments, to H. K. Porter Company Inc., Pittsburgh, Pa., a corporation of Delaware Continuation of application Serial No. 381,696, September 22, 1953. This application April 15, 1958, Serial No. 728,587

2 Claims. (Cl. 72—16)

This invention relates to duct systems for electrical wiring, and relates more particularly to an adapter for a service fitting used with header duct systems.

It is an object of the invention to provide an approved adapter for service fittings which are placed in a floor or a partition. The invention provides a construction which is readily adjustable for differences in floor thickness; which is economical to manufacture; and which can be attached to a duct and adjusted quickly and conveniently.

This application is a continuation of my application Serial No. 381,696, filed Sept. 22, 1953 and now abandoned.

Figure 2:
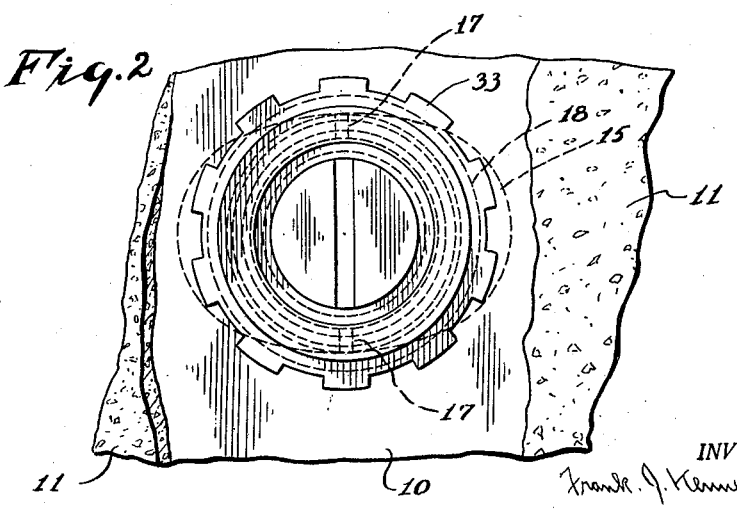

Other objects, features and advantages of the invention will appear or be pointed out as the description proceeds. In the drawing, forming a part hereof, in which like reference characters indicate corresponding parts in all the views;

Figure 1 is a vertical, sectional view through a floor and a header duct equipped with the adapter of this invention; and Figure 2 is a top plan view of the adapter shown in Figure 1.

The drawing shows the invention applied to a cellular floor construction. One of the floor cells 10 is shown with a concrete floor 11 above the cell. With such floors, certain of the cells are commonly used as ducts for electrical wiring. Several electrical cables 12 are shown at the duct 10. These conductors 12 are representative of an electrical wiring system using the duct 10.

At locations where a connection is to be made between the electrical system and a service fitting, it is necessary to provide for access to the duct, and an adapter is necessary for connecting the service fitting with the duct.

The adapter of this invention includes a lower clamping element 15 which extends through an opening 16 in the top wall of the duct 10. This clamping fitting 15 is of generally elliptical shape with a major axis which is longer than the diameter of the opening 16 and a minor axis which is less than the diameter of the opening 16. Figure 1 is a section taken along the major axis of the clamping fitting 15.

Since the width or minor axis of the clamping fitting 15 is less than the diameter of the opening 16, it is possible to insert the clamping fitting through the opening 16 from above the duct 10. The fitting 15 is then moved upwardly into the position shown in Figure 1, with the upper threaded end of the clamping fitting 15 extending above the top of the duct 10. There are openings 17 in the clamping fitting 15 for receiving a tool to hold the clamping fitting in place while a sleeve 18 is screwed over the threaded upper end of the fitting 15. This sleeve 18 is screwed downwardly until the lower end face of the sleeve butts against the top surface of the duct 10. When the sleeve 18 is tightened, the top wall of the duct 10, around the opening 16, is firmly clamped between the fitting 15 and the sleeve 18, and this holds the adapter in place.

A body portion 20 of the adapter has external threads 22 which screw downwardly into the sleeve 18. The opening through the body portion 20 is of a diameter slightly greater than the opening through the clamping fitting 15; and at the upper end of the body portion 20 there is a counterbore 25 with threads for receiving a bushing 26. This bushing is internally threaded for connection with a service fitting 28. When no service fitting 28 is used with the adapter, a plug 30 is screwed into the bushing 26. Thus, the bushing 26 constitutes a cap with a removable center portion consisting of the plug 30.

The plug 30 has a flange 31 at its upper end, and this flange fits into a counterbore 32 which limits the extent to which the plug can be screwed into the bushing and leaves the top of the plug flush with the upper end face of the bushing when the plug is screwed down as far as it will go.

The adapter can be connected to the header 10 at the time that the building is constructed. The body portion 20 of the adapter is screwed into the sleeve 18 as far as necessary to bring the top face of the bushing 26 to the intended level of the finished concrete 11. The body portion 20 is then locked in its adjusted position by a lock nut 33. When the concrete 11 is poured, and the floor surface is finished, the top face of the bushing 26, and the plug 30, form a level portion of the floor.

In a finished building, service fittings can be located at desired points by chiseling a hole 35 in the concrete floor immediately over the duct 10, cutting the hole 16 in the top of the duct, and then inserting the adapter in the same manner as with new construction. With the adapter in place, the hole 35 is filled with concrete to repair the floor around the adapter. The length of the sleeve 18 and the length of the threads on the body portion 20 of the adapter are chosen to give the adapter an adjustable range which provides for the minimum and maximum floor thicknesses which are likely to be encountered in cellular floor constructions.

The preferred construction of the invention has been illustrated and described, but changes and modifications can be made without departing from the invention as defined in the claims.

What is claimed is:

1. A closure for an outlet of an electric header duct, said closure including a cap having an upper surface for location in the plane of the top surface of a concrete floor in which an electric header duct is embedded, an adapter body having a smooth passage therethrough with a counterbore at its upper end having threads for receiving the cap, the outside surface of the adapter body below the level of the counterbore being threaded, a clamping fitting having a bottom flange that contacts with the inside wall of the duct around an opening in the top wall of the duct, the clamping fitting having also a cylindrical portion extending upwardly from the flange and with threads on the outside thereof having the same diameter and pitch as the outside threads on the adapter body, the flange being of reduced diameter in one direction for insertion, when tilted, through the outlet in the header duct, a sleeve having a smooth outside surface and a threaded inside surface of uniform diameter throughout the length of the sleeve and having a bottom end face that abuts the top surface of the header duct, the diameter and pitch of the sleeve threads fitting the threads on the clamping fitting and adapter body, the cylindrical portion of the clamping fitting having a height substantially less than one-half the height of the sleeve, the externally-threaded surface of the adapter body extending into the sleeve, a lock nut on said externally-threaded surface of the adapter body above the sleeve for clamping against the upper end of the sleeve, said threads on the adapter body extending from the lower end thereof upwardly along the adapter body for most of the height of said adapter body and for a distance substantially greater than one-half the height of the sleeve, the clamping fitting covering the lower threads in the sleeve whereby the only exposed threads in the sleeve are in any gap which exists between the upper end of the clamping fitting and the lower end of the adapter body and said exposed threads are, therefore, in a recessed position and confined to an intermediate level of the sleeve.

2. The floor tap described in claim 1 and in which the cap is of composite construction and it includes a bushing screwed into the threaded counterbore and there are screw threads on the inside of the bushing, and includes also a plug that screws into the bushing for closing the upper end of the bushing.

References Cited in the file of this patent

UNITED STATES PATENTS

| | | |
|---|---|---|
| 1,425,781 | Knoderer | Aug. 15, 1922 |
| 1,530,200 | Richardson et al. | Mar. 17, 1925 |
| 1,693,682 | Walker | Dec. 4, 1928 |
| 1,773,811 | Flachbarth | Aug. 26, 1930 |
| 1,820,995 | Wehman | Sept. 1, 1931 |
| 1,913,192 | Cook | June 6, 1933 |
| 2,053,943 | Carlson | Sept. 8, 1936 |
| 2,097,374 | Kennedy | Oct. 26, 1937 |
| 2,575,685 | Shugart | Nov. 20, 1951 |